(12) United States Patent
Ko

(10) Patent No.: US 7,083,550 B2
(45) Date of Patent: Aug. 1, 2006

(54) MOTOR AND INERTIA FLYWHEEL ARRANGEMENT OF A FITNESS MACHINE

(76) Inventor: Chen-Hui Ko, No. 342, Ta Tung Road, Koeishan Hsiang, Taoyuan Hsien (TW)

(*) Notice: Subject to any disclaimer, the term of this patent is extended or adjusted under 35 U.S.C. 154(b) by 129 days.

(21) Appl. No.: 10/943,888

(22) Filed: Sep. 20, 2004

(65) Prior Publication Data

US 2006/0063648 A1 Mar. 23, 2006

(51) Int. Cl.
*A63B 22/00* (2006.01)
*F04D 29/00* (2006.01)

(52) U.S. Cl. .......................... 482/54; 416/60

(58) Field of Classification Search ................ 482/51, 482/54; 416/60; 417/371
See application file for complete search history.

(56) References Cited

U.S. PATENT DOCUMENTS

| | | | | |
|---|---|---|---|---|
| 2,932,447 A | * | 4/1960 | Phelon | 416/60 |
| 5,070,268 A | * | 12/1991 | Phelon et al. | 310/153 |
| 5,329,199 A | * | 7/1994 | Yockey et al. | 310/263 |
| 5,476,430 A | * | 12/1995 | Lee et al. | 482/54 |
| 5,735,669 A | * | 4/1998 | Niemela | 416/60 |
| 6,695,581 B1 | * | 2/2004 | Wasson et al. | 416/60 |

* cited by examiner

*Primary Examiner*—Stephen R. Crow
(74) *Attorney, Agent, or Firm*—Rosenberg, Klein & Lee

(57) ABSTRACT

A motor and inertia flywheel arrangement for fitness machine is disclosed to include a motor, a first fan mounted on the rear end of the motor shaft, and flywheel fastened to the front end of the motor shaft and provided with a belt wheel for synchronous rotation, the flywheel having radial ribs formed in a circular recessed in the back side thereof in proximity to the front side of the motor for working as an induced draft fan during operation of the motor for quick dissipation of heat from the motor.

3 Claims, 4 Drawing Sheets

MOTOR AND INERTIA FLYWHEEL ARRANGEMENT OF A FITNESS MACHINE

BACKGROUND OF THE INVENTION

1. Field of the Invention

The present invention relates to fitness machines and more specifically, to the motor and inertia flywheel arrangement of a fitness machine.

2. Description of the Related Art

FIG. 1 illustrates a motor and inertia flywheel arrangement installed in a treadmill 10. As illustrated, the motor 11 has a motor shaft 12 extended out of the front side and mounted with an inertia flywheel 13 that keeps the rotation of the motor shaft 12 in balance. The inertia flywheel 13 has a belt wheel 14 fixedly provided at the front side and coupled to the drive member of the tread base of the treadmill 10 through a transmission belt 15. The motor 11 produces heat during operation. Accumulation of heat will lower the working efficiency of the motor 11, or may cause the motor 11 to burn out. Therefore, heat must be quickly carried away from the motor 11 during operation of the treadmill 10. According to this design, a fan 6 is fastened to the rear end of the motor shaft 12 for drawing outside currents of air into the inside of the motor 11 during rotation of the motor shaft 12. However, because the inertia flywheel 13 is provided at the front side of the motor 11, it hinders the flowing of the flow of air A passing through narrow gap S in between the rotor 17 and stator 18 of the motor 11, thereby producing a back pressure or causing the flow of air A to change into a turbulent flow. The back pressure or turbulent flow reduces the heat dissipation efficiency of the fan 14 and increases the load to the motor 11, thereby shortening the service life of the motor 11.

SUMMARY OF THE INVENTION

The present invention has been accomplished under the circumstances in view. It is one object of the present invention to provide a motor and inertia flywheel arrangement for fitness machine, which causes a convection of air to dissipate heat from the motor efficiently during operation of the motor. It is another object of the present invention to provide a motor and inertia flywheel arrangement for fitness machine, which eliminates the formation of a back pressure during the operation of the motor. It is still another object of the present invention to provide a motor and inertia flywheel arrangement for fitness machine, which saves installation space.

To achieve these and other objects of the present invention, the motor and inertia flywheel arrangement of a fitness machine comprises a motor, the motor having a front side, an output shaft, the output shaft having a front end extended out of the front side and a rear end, and a first fan affixed to the rear end of the output shaft; and an inertia flywheel mounted on a front end of the output shaft outside the front side of the motor for synchronous rotation with the output shaft, the inertia flywheel having a belt wheel fixedly connected thereto; wherein the inertia flywheel comprises a circular recess that receives the front side of the motor, the circular recess having a flat bottom wall facing the front side of the motor, a tapered peripheral wall spaced around the periphery of the front side of the motor, and a plurality of radial ribs protruded from the flat bottom wall and respectively connected to the tapered peripheral wall for inducing currents of air out of the motor upon rotation of the inertia flywheel with the motor.

DETAILED DESCRIPTION OF THE PREFERRED EMBODIMENT

Figure 1:
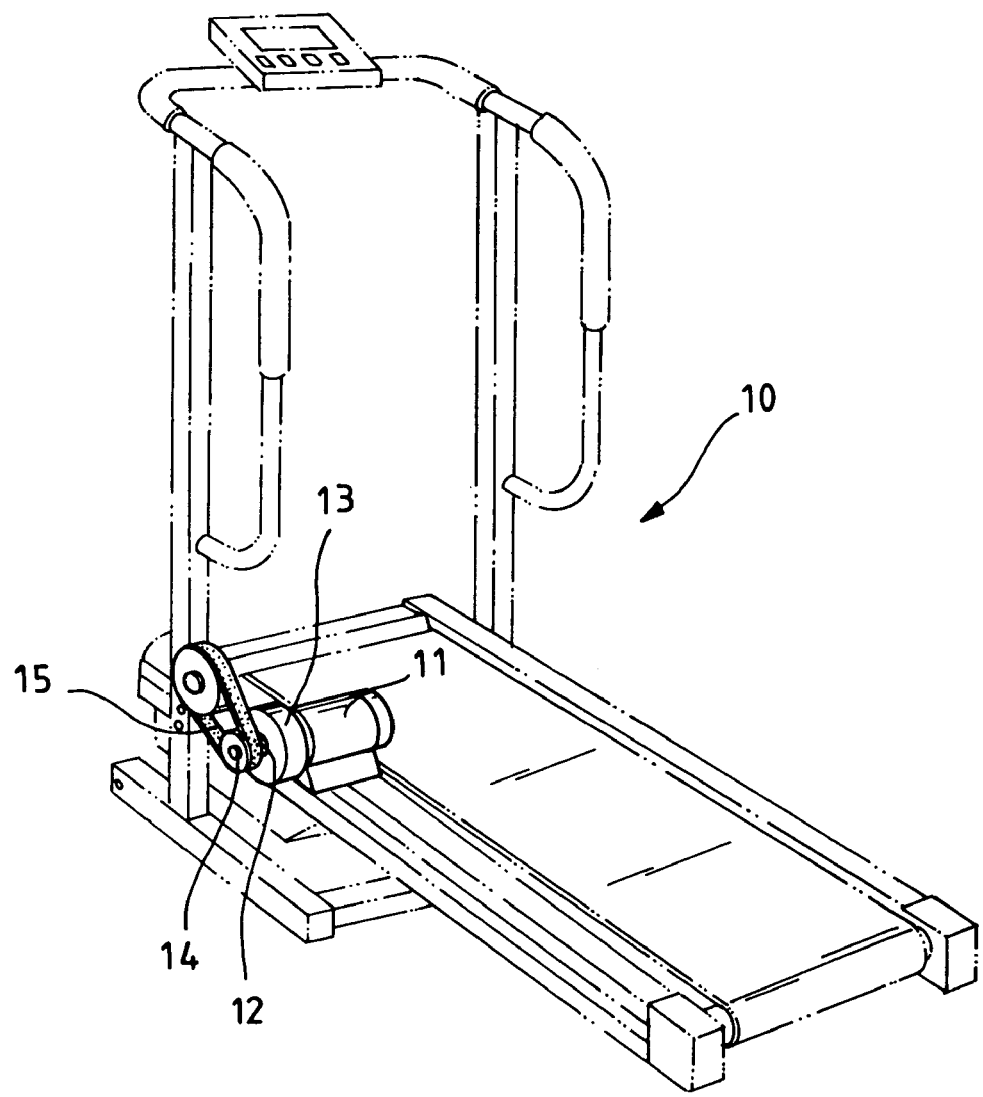
FIG. 1 illustrates the arrangement of a motor in a fitness machine according to the prior art.
Figure 2:
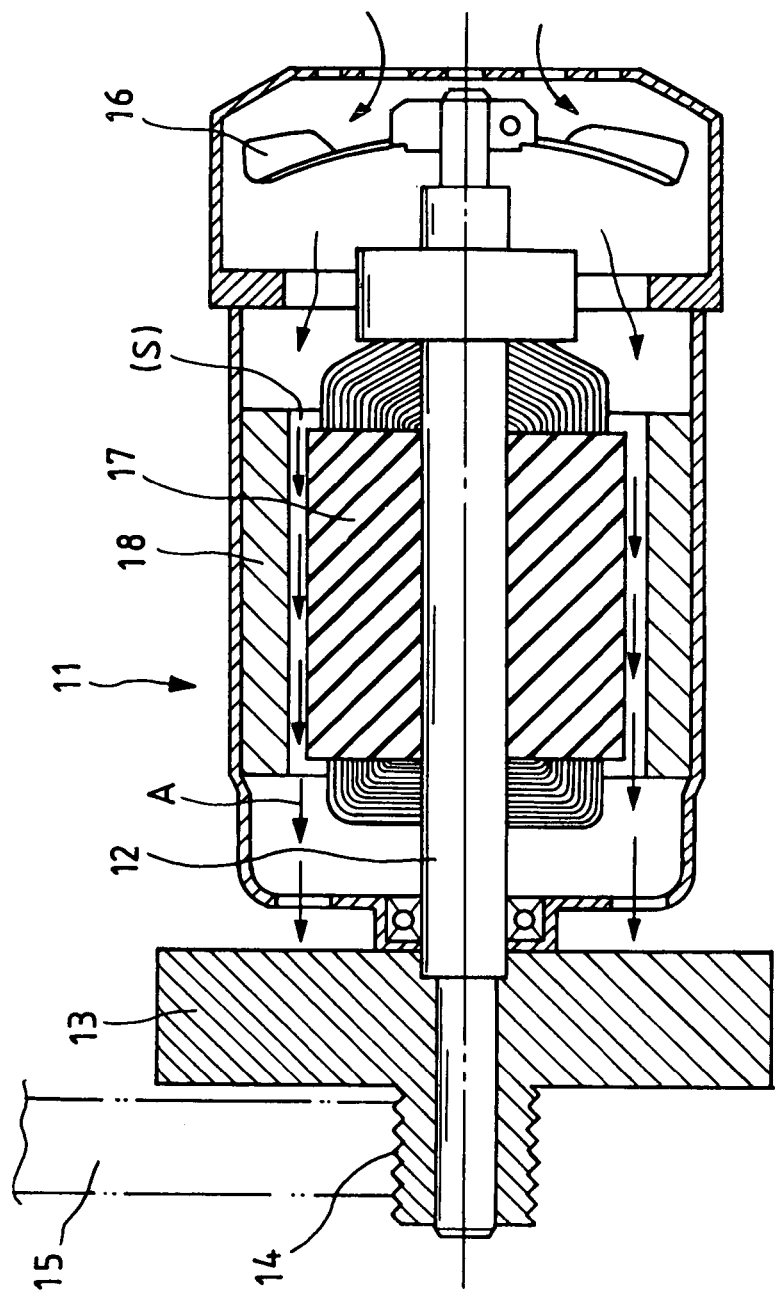
FIG. 2 is a sectional view of the motor shown in FIG. 1.
Figure 3:
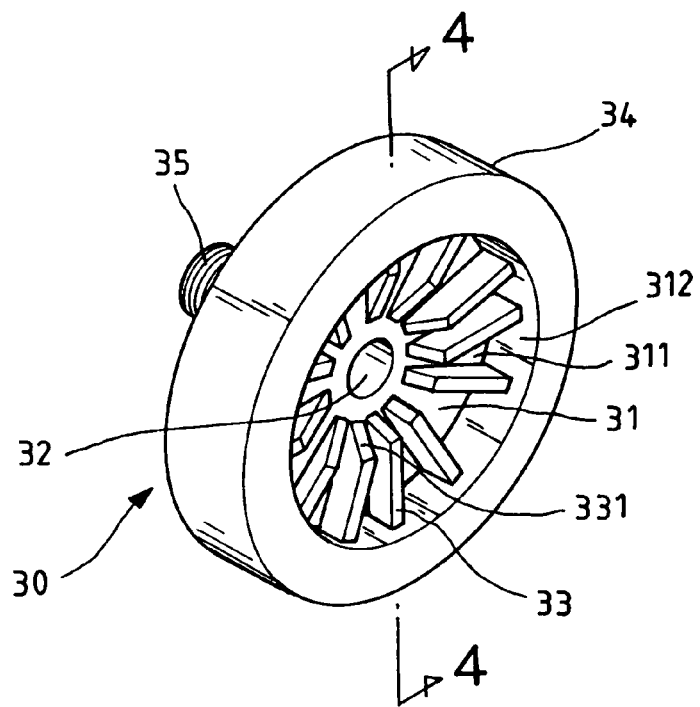
FIG. 3 is a perspective view of an inertia flywheel according to the present invention.
Figure 4:
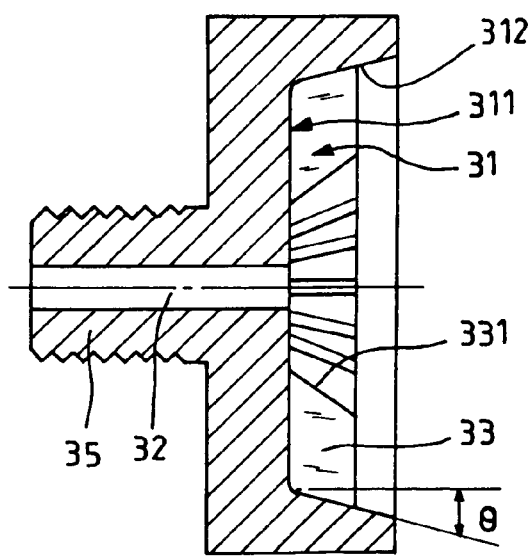
FIG. 4 is a sectional view of the inertia flywheel according to the present invention.
Figure 5:
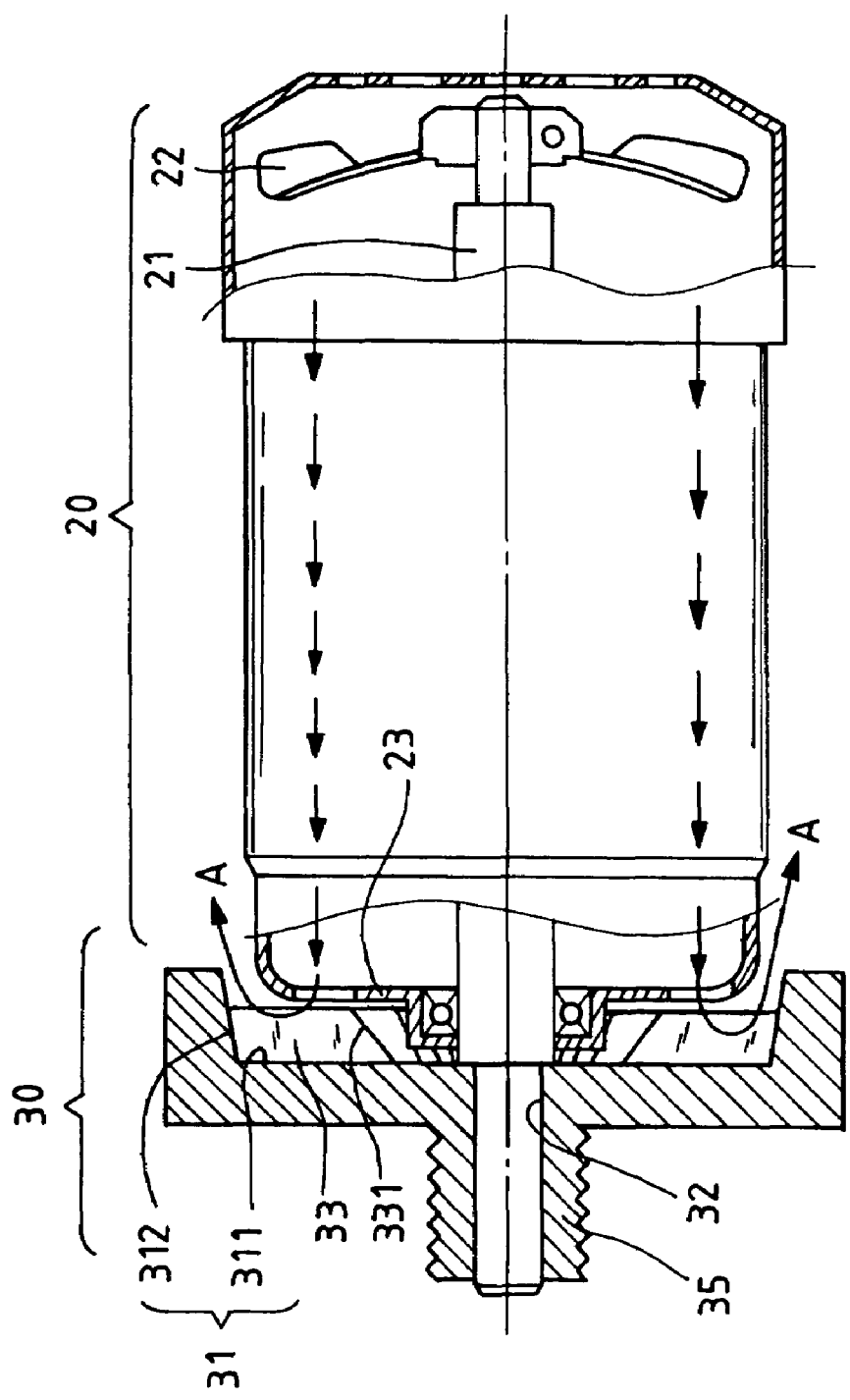
FIG. 5 is a schematic sectional view of the present invention, showing the convection of air through the motor during operation of the motor.

Referring to FIGS. 3~5, the invention comprises a motor 20, which has the rear end of the shaft 21 mounted with a fan 22, and an inertial flywheel 30, which is fastened to the front end of the shaft 21 in front of the front side 23 of the motor 20 and has a belt wheel 35 fixedly provided at the front side opposite to the motor 20.

The main features of the present invention are outlined hereinafter with reference to FIGS. 3~5 again. The inertial flywheel 30 has a circular recess 31 in the rear side. The circular recess 31 is greater than the outer diameter of the motor 20 so that the peripheral wall 34 of the inertia flywheel 30 surrounds the front side 23 of the motor 20 after connection of the inertial flywheel 30 to the shaft 21 of the motor 20. The circular recess 31 has a tapered peripheral wall 312 and a flat bottom wall 311. The inner diameter of the tapered peripheral wall 312 increases gradually in direction from the flat bottom wall 311 toward the outside. The inertia flywheel 30 has a center axle hole 32 extended through the center of the flat bottom wall 311 of the circular recess 31 and the center of the belt wheel 35 for fastening to the shaft 21 of the motor 20, and a plurality of radial ribs 33 formed integral with the flat bottom wall 311 and equiangularly spaced around the center axle hole 32. After connection of the inertia flywheel 30 to the shaft 21 of the motor 20, the radial ribs 33 are kept in proximity to the front side 23 of the motor 20. During operation of the motor 20, the inertia flywheel 30 is rotated with the shaft 21 of the motor 20, and the radial ribs 33 are rotated with the inertia flywheel 30. Therefore, the radial ribs 33 form with the circular recess 31 a second fan that is an induced draft fan.

Referring to FIGS. 3 and 4 again, the tapered peripheral wall 312 extends outwards from the border area of the flat bottom wall 311 at an angle of slope $\theta$ about −2 to 8. The height of the radial ribs 33 is shorter than the depth of the circular recess 31. The radial ribs 33 each have an outer end connected to the tapered peripheral wall 312 of the circular recess 31 and an inner end terminating in a bevel edge 331. During rotation of the shaft 21 of the motor 20, as shown in FIG. 5, the fan 22 and the inertia flywheel 30 are rotated with the aft 21. The fan 22 is a forced draft fan that sucks outside air into the inside of the motor 20 during rotation of the shaft 21. At the same time, the second fan (induced draft fan) is synchronously rotated. The suction force of the induced draft fan is lower than the fan 22, however it is sufficient to suck air out of the motor 20, thereby causing a convection of air A that carries heat out of the motor 20. The flow of air that comes out of the motor 20 is stopped by the flat bottom wall 311 of the circular recess 31 and forced by the flat bottom wall 311 to flow through gaps in between the radial ribs 33 along the tapered peripheral wall 312 of the circular recess 31 to the atmosphere without producing back pressure or changing into a turbulent flow. Because the invention greatly improves the heat dissipation efficiency of the motor 20, the working efficiency of the motor 20 is relatively improved and, the service life of the motor 20 is relatively prolonged.

A prototype of motor and inertia flywheel arrangement of a fitness machine has been constructed with the features of the annexed drawings of FIGS. 3~5. The motor and inertia flywheel arrangement of a fitness machine functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

The invention claimed is:

1. A motor and inertia flywheel arrangement for fitness machine comprising:

a motor, said motor having a front side, an output shaft, said output shaft having a front end extended out of said front side and a rear end, and a first fan affixed to the rear end of said output shaft; and an inertia flywheel mounted on a front end of said output shaft outside the front side of said motor for synchronous rotation with said output shaft, said inertia flywheel having a belt wheel fixedly connected thereto;

wherein said inertia flywheel comprises a circular recess that receives the front side of said motor, said circular recess having a flat bottom wall facing the front side of said motor, a tapered peripheral wall spaced around the periphery of the front side of said motor, and a plurality of radial ribs protruded from said flat bottom wall and respectively connected to said tapered peripheral wall for inducing currents of air out of said motor upon rotation of said inertia flywheel with said motor.

2. The motor and inertia flywheel arrangement as claimed in claim 1, wherein said tapered peripheral wall slopes radially outwards from said flat bottom wall toward the outside of said inertia flywheel at an angle of slope θ about −2 to 8°.

3. The motor and inertia flywheel arrangement as claimed in claim 1, wherein said radial ribs each have a height shorter than the depth of said circular recess, an outer end connected to said tapered peripheral wall and an inner end terminating in a bevel edge.

* * * * *